United States Patent
Appleyard

(10) Patent No.: US 11,124,218 B2
(45) Date of Patent: Sep. 21, 2021

(54) STEERING COLUMN ASSEMBLIES

(71) Applicant: TRW Limited, Solihull (GB)

(72) Inventor: Michael Appleyard, Cheltenham (GB)

(73) Assignee: ZF Automotive UK Limited

(*) Notice: Subject to any disclaimer, the term of this patent is extended or adjusted under 35 U.S.C. 154(b) by 53 days.

(21) Appl. No.: 16/509,891

(22) Filed: Jul. 12, 2019

(65) Prior Publication Data

US 2020/0039561 A1 Feb. 6, 2020

(51) Int. Cl.
*B62D 1/16* (2006.01)
*B62D 5/00* (2006.01)

(52) U.S. Cl.
CPC ............... *B62D 1/16* (2013.01); *B62D 5/001* (2013.01)

(58) Field of Classification Search
CPC .............................. B62D 1/16; B62D 15/0205
See application file for complete search history.

(56) References Cited

U.S. PATENT DOCUMENTS

| 1,520,123 | A | * | 12/1924 | Gillen | ...................... B62D 1/16 411/344 |
| 3,049,938 | A | | 8/1962 | Hulten et al. | |
| 2020/0039572 | A1 | * | 2/2020 | Appleyard | ............... B62D 1/10 |
| 2020/0331514 | A1 | * | 10/2020 | Strong | ................... B62D 1/184 |

FOREIGN PATENT DOCUMENTS

JP 2016134330 A 7/2016

* cited by examiner

*Primary Examiner* — Faye M Fleming
(74) *Attorney, Agent, or Firm* — Robert James Harwood

(57) ABSTRACT

A steering column assembly for a vehicle includes a housing, a shaft and an end stop means. The shaft is rotatably mounted with respect to the housing and is configured for attachment of a steering wheel at one end with an engagement portion connected to and configured to rotate with the shaft. The end stop means is located in the path of the engagement portion and engageable with the engagement portion upon rotation of the shaft through a predetermined angle. The engagement portion engages with the end stop means upon rotation of the shaft through predetermined angles in both directions. The engagement portion includes a member projecting outwardly from the shaft. The end stop means is mounted on the housing and the end stop means comprises a strip of material bent into a generally T-shape.

16 Claims, 2 Drawing Sheets

STEERING COLUMN ASSEMBLIES

CROSS-REFERENCE TO RELATED APPLICATIONS

This application claims priority to United Kingdom patent application 1812438.8, filed 31 Jul. 2018, the disclosure of which is incorporated herein by reference in its entirety.

TECHNICAL FIELD

The present disclosure relates to steering column assemblies and in particular, but not exclusively, to steering column assemblies for use with a steer-by-wire hand wheel actuator.

BACKGROUND

Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering vehicle (typically having a "steer-by-wire" operation) must be provided.

In such steer-by-wire arrangements, a hand wheel (steering wheel) is connected to one end of a shaft whose angular displacement is measured to generate a signal which is used to control the orientation of the steering wheels of the vehicle.

One problem which occurs with such steer-by-wire arrangements arises from the fact that the vehicle wheels are not physically connected to the steering wheel, in contrast to a conventional mechanical steering arrangement. The steered wheels can only pivot through a given range of motion, and it is therefore important to limit the maximum rotational of the steering wheel so that it corresponds to the maximum extent of pivoting of the steered wheels, otherwise a driver of the vehicle would be able to rotate the steering wheel indefinitely when the steered wheels are at their maximum steering angle.

SUMMARY

In accordance with the present disclosure, a steering column assembly for a vehicle comprises a housing, a shaft rotatably mounted with respect to the housing and being configured for attachment of a steering wheel at one end, an engagement portion connected to and configured to rotate with the shaft, and end stop means located in the path of the engagement portion and engageable with the engagement portion upon rotation of the shaft through a predetermined angle, wherein the engagement portion is engageable with end stop means upon rotation of the shaft through predetermined angles in both directions, the engagement portion comprises a member projecting outwardly from the shaft, the end stop means is mounted on the housing and the end stop means comprises a strip of material bent into a generally T-shape. Such an arrangement allows a steering wheel attached to the shaft to be rotated through almost a complete half turn in both directions before its further rotation is stopped by engagement of the engagement portion with the end stop means.

In one embodiment, the engagement portion comprises a member received in, and projecting outwardly from, a recess in the shaft. For example, the engagement portion may comprise a Woodruff key seated in a keyway in the shaft.

The assembly may further comprise means for limiting the outward displacement of the engagement portion, for example a press fit or welds between the engagement portion and the shaft.

In a preferred embodiment, the end stop means is resiliently deformable to provide a "soft-stop" effect upon engagement of the engagement portion with the end stop means. The strip of material may comprise a stem portion formed from two parallel layers and a perpendicular cross-bar portion formed from an upper continuous layer whose ends are contiguous with a respective one of two lower layer halves each of which merges into a respective one of the two parallel layers of the stem portion. The stem portion preferably passes through a slot in the housing. The perpendicular cross-bar portion may be received in a recess in the outer face of the housing. The strip of material may be formed from metal, for example spring steel or stainless steel.

BRIEF DESCRIPTION OF THE DRAWINGS

Hereinafter the present disclosure shall be illustrated in detail by way of an embodiment and with reference to the enclosed drawings, wherein.

DETAILED DESCRIPTION

Figure 1C:
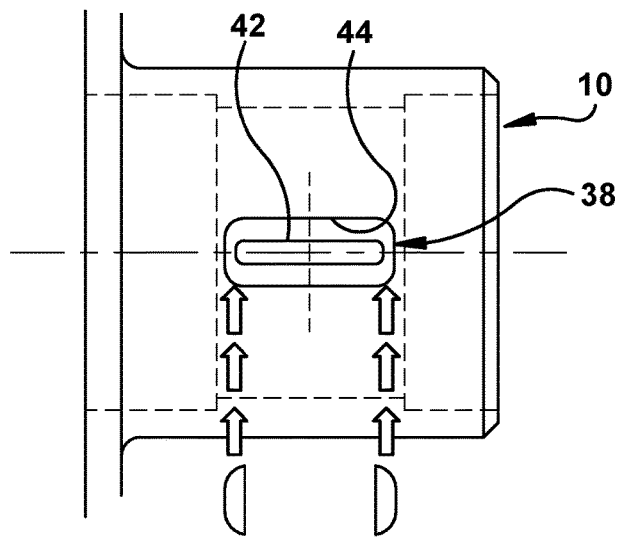
FIG. 1(c) is a plan view of the first embodiment of steer-by-wire steering wheel turn limiting mechanism in accordance with the present disclosure.
Figure 1A:
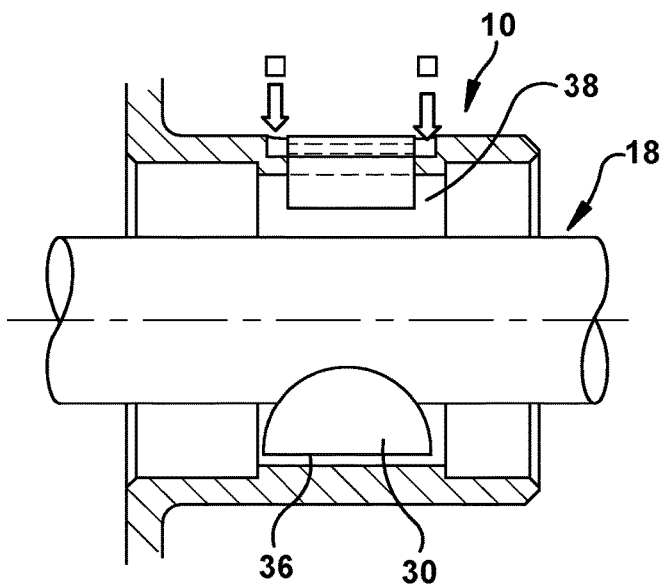
FIG. 1(a) is a longitudinal cross-section of a first embodiment of steer-by-wire steering wheel turn limiting mechanism in accordance with the present disclosure.
Figure 1B:
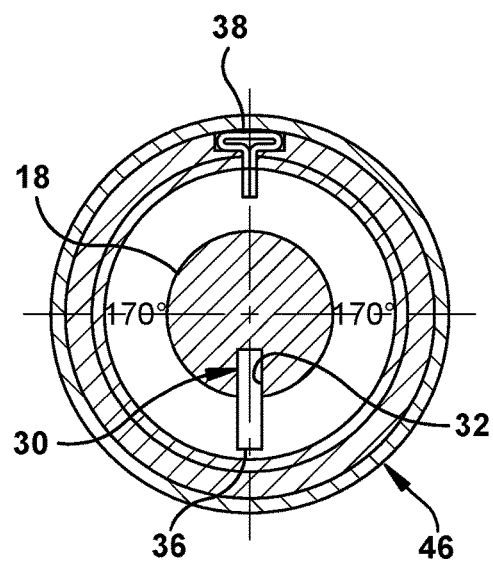
FIG. 1(b) is a transverse cross-section of the first embodiment of steer-by-wire steering wheel turn limiting mechanism in accordance with the present disclosure.
Figure 2A:
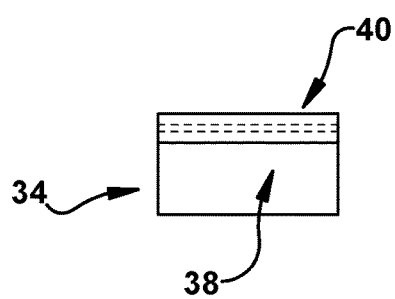
FIG. 2(a) is a side view of an end stop of the turn limiting mechanism of FIG. 1.
Figure 2B:
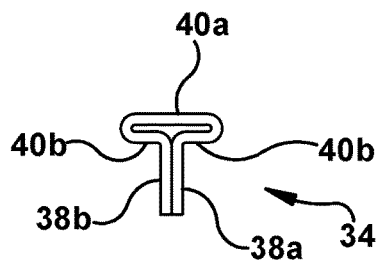
FIG. 2(b) is an end view of an end stop of the turn limiting mechanism of FIG. 1.
Figure 3:
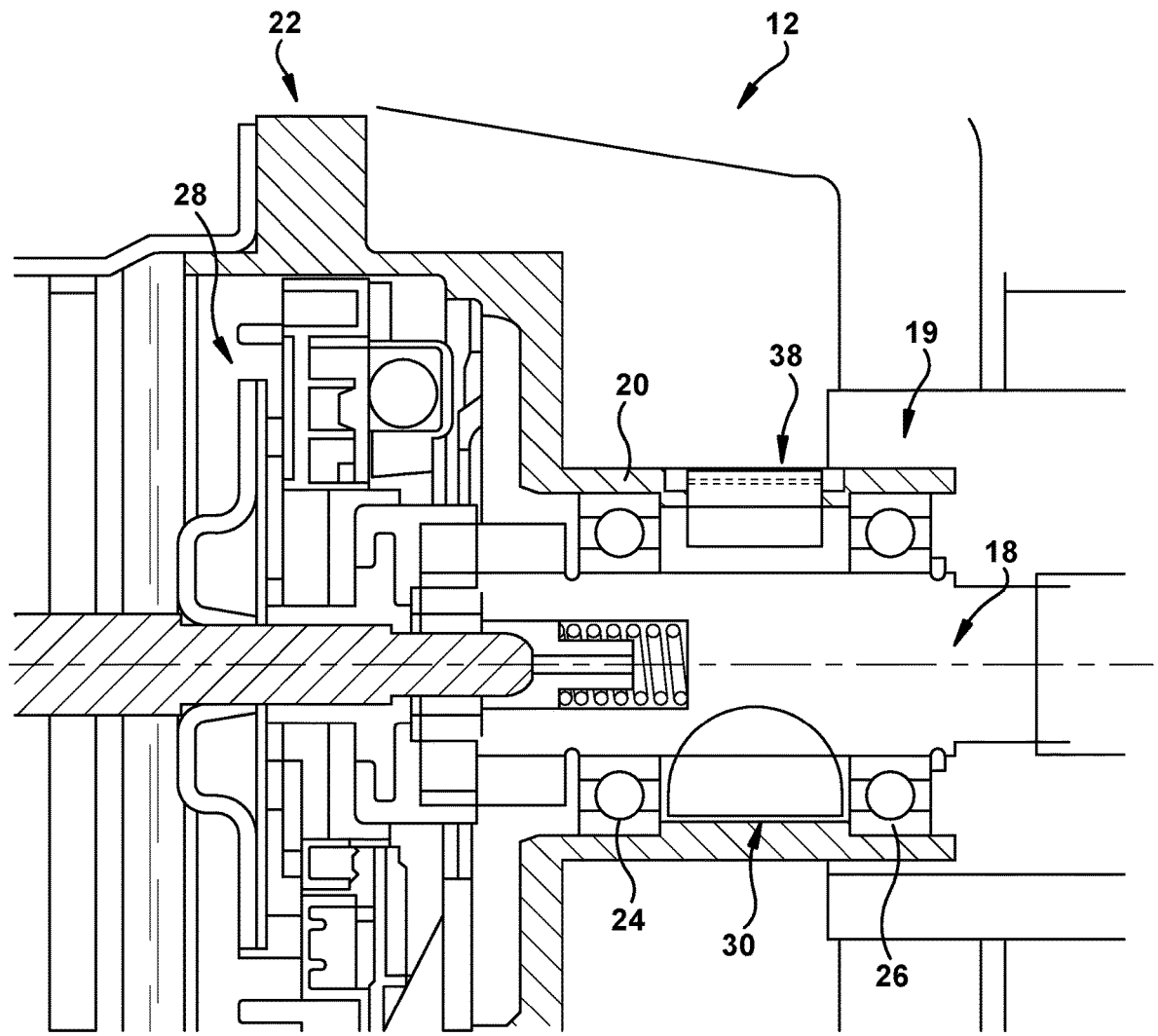
FIG. 3 is a longitudinal cross-section through a portion of a steering column of a steer-by-wire steering mechanism, to which the turn limiting mechanism of FIG. 1 has been fitted.

One embodiment of steer-by-wire steering wheel turn limiting mechanism 10 in accordance with the present disclosure is illustrated in FIGS. 1 to 3. The mechanism is installed inside a steering column 12 of a hand wheel actuator assembly which is part of a steer-by-wire system for a road vehicle. In such steer-by-wire systems, rotation of the steering wheel by a driver of the vehicle is detected and used to generate a signal which in turn is used to control one or more actuators to turn the steered wheels by an amount corresponding to the rotation of the steering wheel. In such arrangements, there is no mechanical connection between the steering wheel and the mechanism which displaces the steered wheels and it is therefore important to limit the maximum rotation of the steering wheel in both directions to correspond with the maximum displacement of the steered wheels in both directions.

A steering wheel (not illustrated) is attached to one end of a main shaft 18 (the right-hand end of the shaft as shown in FIG. 3) located within an elongate main housing 19 and is rotatably mounted in a tubular extension 20 of the main housing 22 by means of two sets of longitudinally separated bearings 24, 26. The main housing 22 also encloses a motor 28 whose output is connected to the inner end of the main shaft 18 in order to provide a sensation of road feel to the driver.

The steering wheel turn limiting mechanism 10 is mounted between the two sets of bearings 24, 26. The mechanism comprises a projection in the form of a Woodruff key 30 which is seated in a complementarily-shaped recess 32 in the main shaft 18, which is engageable with an end stop insert 34 mounted in the tubular extension 20 of the main housing 22. The Woodruff key 30 is retained in the recess 32 in the main shaft 18 by engagement of the outer edge of 36 of the key with the inner cylindrical face of the tubular extension 20 and therefore rotates with the main shaft 18. The Woodruff key is located on the main shaft so that it is oriented in the lowermost position when the steering wheel is in the "straight ahead" position.

The end stop insert 34 is formed from a single strip of spring steel plate bent into a T-shape having a "vertical" stem portion 38 (when viewed in cross-section) formed from two parallel layers 38a, 38b of the spring steel plate and a perpendicular cross-bar portion of 40 formed from an upper continuous layer 40a whose ends are contiguous with a respective one of two lower layer halves 40a, 40b which are mirror images of each other and each of which merges into a respective one of the two parallel layers 38a, 38b of the stem portion 38.

The stem portion 38 of the end stop insert 34 passes through a slot 42 in the upper face of the tubular extension 20 of the main housing 22 and the cross-bar portion 40 is received in a countersunk pocket 44 around the slot 42, whereby the stem portion 38 projects into the interior of the tubular extension 20. The end stop insert 34 is retained in position by a column tube 46 which is fitted over the tubular extension 20.

The steering wheel, and the main shaft 18 to which the steering wheel is connected, is therefore able to rotate through approximately 180° in opposite directions, the rotation being limited by the appointment of the Woodruff key 30 with the stem portion 38 of the end stop insert 34. The maximum angular displacement in each direction is slightly less than 180°, approximately 170°, in view of the thickness of the Woodruff key 30 and the stem portion 38 of the end stop insert 34.

The two layers 38a, 38b of the stem portion 38, formed from spring steel, can slide relative to each other and are therefore able to flex, which cushions the impact when the steering wheel reaches its limit of travel in either direction. The ability of the two layers of the stem portion 38 to deflect is further enhanced by the flexibility of the cross-bar portion 40 to which they are connected, as the continuous upper layer 40a of the cross-bar portion is cantilevered from a point which is distal from its connections to the two layers of the stem portion 38.

What is claimed is:

1. A steering column assembly for a vehicle, comprising:
   a housing;
   a shaft rotatably mounted with respect to the housing and being configured for attachment of a steering wheel at one end, an engagement portion connected to and configured to rotate with the shaft about a longitudinal axis of the shaft; and
   an end stop means located in a path of the engagement portion and engageable with the engagement portion upon rotation of the shaft about the axis through a predetermined angle,
   wherein the engagement portion is engageable with the end stop means upon rotation of the shaft about the axis through predetermined angles in both directions, the engagement portion comprises a member projecting outwardly from the shaft, the end stop means is mounted on the housing and the end stop means comprises a strip of material bent into a generally T-shape.

2. The steering column assembly as defined in claim 1, wherein the engagement portion comprises a member received in, and projecting outwardly from, a recess in the shaft.

3. The steering column assembly as defined in claim 2, wherein the engagement portion comprises a Woodruff key seated in a keyway in the shaft.

4. The steering column assembly as defined in claim 1, wherein the end stop means is resiliently deformable.

5. The steering column assembly as defined in claim 1, wherein the strip of material comprises a stem portion formed from two parallel layers and a perpendicular cross-bar portion formed from an upper continuous layer whose ends are contiguous with a respective one of two lower layer halves each of which merges into a one of the two parallel layers of the stem portion.

6. The steering column assembly as defined in claim 5, wherein the stem passes through a slot in the housing.

7. The steering column assembly as claimed in claim 6, wherein the cross-bar portion is received in a recess in an outer face of the housing.

8. The steering column assembly as defined in claim 5, wherein the strip of material is formed from metal.

9. The steering column assembly as defined in claim 8, wherein the metal comprises spring steel.

10. The steering column assembly as defined in claim 8, wherein the metal comprises stainless steel.

11. The steering column assembly as defined in claim 1, wherein the end stop means includes a stem portion that extends in the housing from an inner face of the housing toward the shaft.

12. A steering column assembly for a vehicle, comprising:
    a housing;
    a shaft rotatably mounted with respect to the housing and being configured for attachment of a steering wheel at one end;
    a projection received in and projecting outwardly from a recess in the shaft, the projection being configured to rotate with the shaft about a longitudinal axis of the shaft; and
    an end stop means mounted on the housing and located in a path of the projection, the projection being engageable with the end stop means upon rotation of the shaft about the axis through a predetermined angle.

13. The steering column assembly as defined in claim 12, wherein the end stop means has a stem portion that extends from an inner face of the housing toward the shaft.

14. The steering column assembly as defined in claim 13, wherein the end stop means has a cross-bar portion mounted on an outer face of the housing, the stem portion extending from the cross-bar portion through a slot in the housing into the housing.

15. The steering column assembly as claimed in claim 14, wherein the cross-bar portion is received in a recess in the outer face of the housing.

16. The steering column assembly as defined in claim 12, wherein end stop means comprises a strip of material bent into a generally T-shape, the strip of material having a stem portion formed from two parallel layers and a perpendicular cross-bar portion formed from an upper continuous layer whose ends are contiguous with a respective one of two lower layer halves each of which merges into a one of the two parallel layers of the stem portion.

* * * * *